May 3, 1955  M. D. SULLIVAN  2,707,642
WHEEL SUSPENSION
Filed March 15, 1951  2 Sheets-Sheet 1
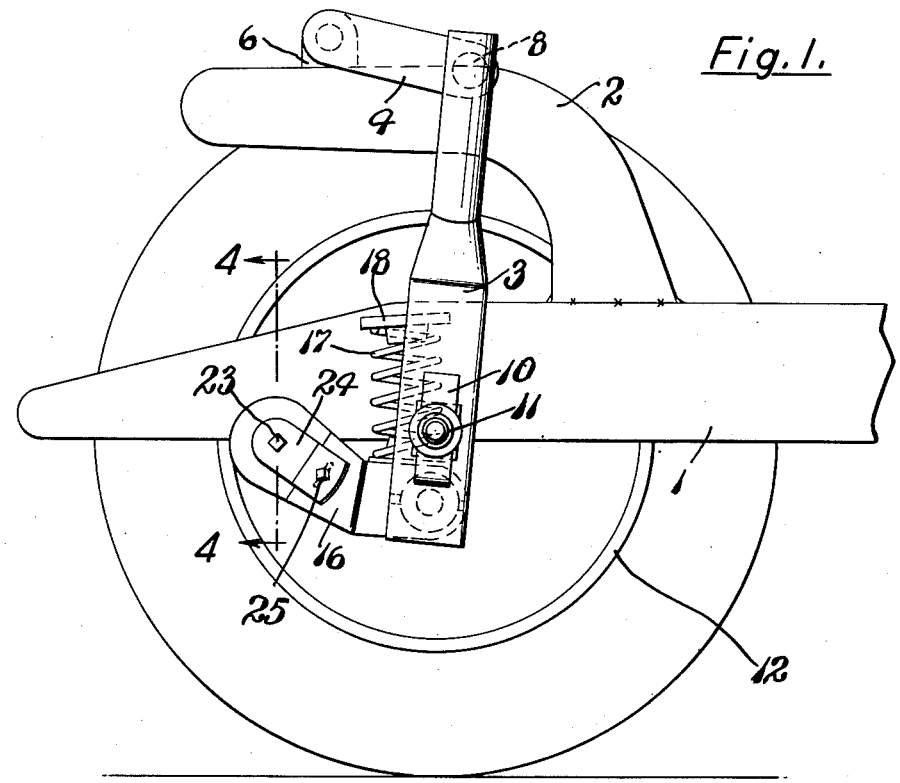
Fig. 1.
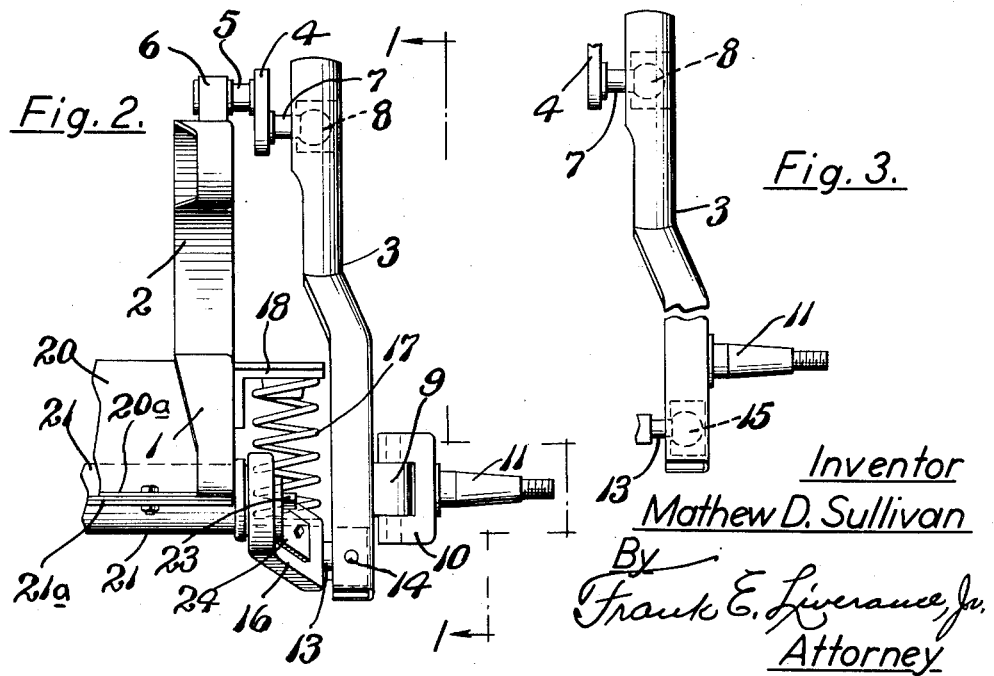
Fig. 2.
Fig. 3.
Inventor
Mathew D. Sullivan
By
Frank E. Liverance, Jr.
Attorney

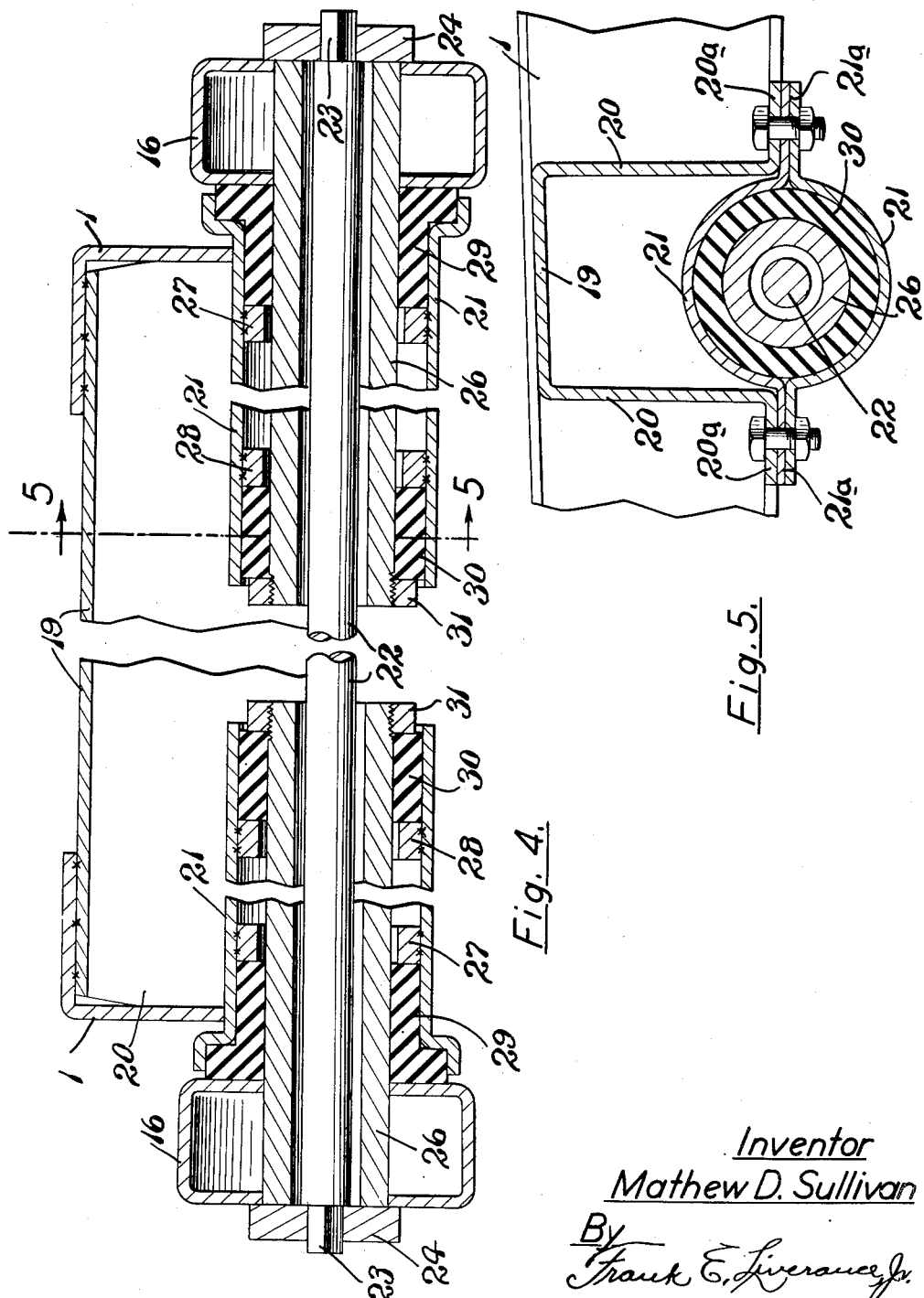

United States Patent Office 2,707,642
Patented May 3, 1955

2,707,642
WHEEL SUSPENSION

Mathew D. Sullivan, Flint, Mich.

Application March 15, 1951, Serial No. 215,787

5 Claims. (Cl. 280—96.2)

The present invention relates to a novel, practical and effective wheel suspension for motor vehicles and which is particularly adapted to be used at the front of an automobile or other motor vehicle, the wheels being mounted for change of direction and for moving over roads or ground which is not level. Such wheel suspension including the wheel mountings and connections between them is produceable as a unit which is readily applied to a chassis frame, in assembling the wheel suspension with the remainder of the motor vehicle.

Many novel structures and arrangements and combinations and parts for effectively obtaining the objects and purposes of the invention stated, as well as others not at this time enumerated, will be apparent from the following description, taken in connection with the accompanying drawings, of a preferred form of structure embodying my invention.

In such drawings:

Fig. 1 is a side elevation of the spring assembly unit of my invention assembled and connected with a chassis frame, fragmentarily shown, looking in the direction indicated by the line 1—1 of Fig. 2.

Fig. 2 is a fragmentary front elevation of such unit at one end thereof.

Fig. 3 is a fragmentary front elevation, similar to that shown in Fig. 2 with parts removed, showing a modification in structure.

Fig. 4 is an enlarged longitudinal section through the mechanism shown in Fig. 1, substantially on the plane of line 4—4 of Fig. 1, and Fig. 5 is a transverse vertical section, substantially on the plane of line 5—5 of Fig. 4.

Like reference characters refer to like parts in the different figures of the drawings.

The chassis frame side members 1, which are spaced from each other, in my invention, adjacent their front end portions, have permanently secured thereto as by welding, upwardly and forwardly extending arms 2 which, at their free front ends, are spaced above the front end portions of the side frame members 1. At the outer side of each frame member 1 and connected arm 2, a generally vertical member 3 is located which, between its ends, is offset so that the lower end portion is outwardly of the upper end portion thereof. A link bar 4 has a pivotal connection to turn about a horizontal axis, by means of a stud 5 extending therefrom to and through a boss 6 in which the stud is turnably mounted, a boss being permanently secured by welding or the like at the upper side and front portion of each arm 2. The stud 5 is at the front end of the link arm 4. At its rear end a stud 7 extends outwardly and is equipped with a ball 8 at its outer end suitably seated in a socket therefor carried at the upper end portion of the member 3.

Such member 3, adjacent its lower end, has an outwardly extending boss 9, upon which a fork 10 is mounted to turn about a vertical axis. From the fork a spindle 11 extends outwardly on which a wheel 12 is mounted for rotation. It is to be understood that such fork 10 is adapted to have a rearwardly extending arm, the two arms, one at each side of the motor vehicle being connected by a connecting rod which is adapted to be moved lengthwise back and forth through operation of the usual automobile steering wheel.

At the lower end and inner side of the member 3, at each side of the chassis frame, a stud 13 is mounted adapted to turn about the horizontal axis of a pivot pin 14 extending from the front to rear through and adjacent the lower end of the member 3. Such pin or stud 13 has a rotatable connection with a relatively strong and heavy arm 16, at the rear end thereof, so that such arm may have a rotative movement with respect to the stud 13 about its horizontal axis. The lower end of a heavy coiled compression spring 17 rests upon the upper side and rear end of each arm 16. At its upper end it is against an abutment bracket 18 permanently secured to and extending outwardly one from each chassis frame member 1. Such springs 17, shown as one for each side of the motor vehicle, may be varied in number without changing the operation or principle of the invention.

A cross member of inverted channel form having an upper web 19 (Figs. 4 and 5) and spaced downwardly extending parallel sides 20, each terminating in an outwardly extending flange 20a, at its ends is permanently secured by welding to the chassis frame members 1 (Fig. 4), in front of the plane of the spindles 11 and substantially in the plane of the front end portions of the arms 16. The lower flanges of the chassis frame members 1 and portions of the vertical webs thereof are cut away to make a generally semi-circular recess at the under side of each chassis frame member for the reception of the upper portions of housings horizontally located, one associated with each of the chassis frame members 1.

The housings include upper and lower semi-cylindrical housing members 21 which have outwardly extending front and rear horizontal edge flanges 21a, which are located underneath the flanges 20a of the cross beam and are bolted or otherwise permanently secured thereto. Such housings, as shown in Fig. 4 are in horizontal alignment, one extending upwardly into the recessed portion of the adjacent chassis members 1, the greater portion of the length of such housings being at the inner sides of the frame members 1 and extending toward each other.

A rod 22 preferably of a spring steel, passes through said housings and through the outer end portions of the arms 16. Rod 22 at each end is provided with an integral stud 23 preferably square in cross section, which extends beyond the outer side of its associated arm 16. At the outer side of each arm 16 a plate 24 is located, having a square opening through which the adjacent stud 23 passes (Fig. 1). The plate 24 lies each alongside its associated arm 16 and preferably is adjustably connected, by means of a bolt and slot connection, shown in Fig. 1, adjacent its rear end to the arm 16.

A cylindrical sleeve 26 of metal passes through each of the housings 21 and is located centrally and axially thereof. The outer end of each sleeve 26 is against the inner side of an associated plate 24. Within each sleeve 21 stops 27 and 28 of circular form are welded, being disposed around the sleeves 26 and spaced from each other. The stops 27 are toward the outer ends of the sleeves and the stops 28 toward the inner ends thereof. A rubber bushing 29 surrounds each sleeve 26 having its outer end against the inner side of the adjacent arm 16, and its inner end against the stops 27 therefor. A second rubber sleeve 30 is at the inner end portion of each of the housings 21, at one end coming against the stops 28 and at the other end being pressed against by a nut 31 which is screwed onto the inner end of each sleeve 26.

In Fig. 3, instead of having a vertical pivot for the fork 10 and a horizontal pivot at 14, the stud 13 at its outer end is provided with a ball 15 (Fig. 3) mounted in a socket at the lower end of the member 3. The wheel spindle 11 is directly connected at its inner end to the member 3. With this structure the member 3 and spindle 11 may turn about a generally vertical axis extending through the centers of the upper ball 8 and the lower ball 15, so that a wheel can be changed in direction in steering with such structure as well as that shown in Fig. 2.

The front wheel assembled unit, consisting of the cross beam 19, shaft 22, sleeves 21 and the parts associated therewith, the vertical members 3, arms 24 and other parts described may be manufactured and assembled substantially as a unit and thereafter attached to the chassis frame which will be equipped with the overhead arms 2 and the brackets 18. The links 4 are then pivotally connected to the bosses 6 and the end portions of the cross beam 19 welded to the chassis frame members 1.

With the wheel suspension structure as described the springs 17 or equivalents compress under the load carried by the front portions of the motor vehicle; and upon level road the cross shaft 22 will not be under torsional strain. Such cross shaft 22 is designed for and is adapted to sustain torsional strain, for example, if at one side a wheel is lower than at the other side of the motor vehicle during operation thereof, due to shocks sustained by the wheels when passing over the road or ground which may be at times of a non-level character. The wheels may be turned about vertical axes for change of direction in steering. To obtain a proper positioning of both sides of the front portion of a motor vehicle using the wheel suspension of my invention, the adjustment of the plates 24 is available. The members 3 extend upwardly as high and, in general, somewhat higher than the upper side of the tire on a wheel 12. The wheels 12 may take the many positions which occur in driving without interfering with the members 3 in any respect and all the movements required occur without more than normal strain in all parts of the structure, except in the cross shaft or rod 22 which is adapted for and designed to deform under torsional forces, which forces tend to return the parts to initial position when free to do so.

While the structure has been described in connection with the front wheel suspension of motor vehicles, it is also available for the rear suspension, requiring only minor variations in design for the adaptation and connection to the rear portion of chassis frame.

Simplicity, durability in service and economy are attained.

The invention is defined in the appended claims and is to be considered comprehensive of all forms of structure coming within their scope.

I claim:

1. In a structure as described, two spaced apart generally horizontal chassis side frame members, a cross frame member connected at its ends to and extending between said chassis frame members, elongated housings of generally cylindrical form connected with said cross member at the lower sides of said frame members, said housings being located in horizontal axial alignment, a sleeve located within and axially of each housing, an arm at the end of each of the sleeves beyond the outer end of each housing, through which arms the end portions of the sleeves pass, a continuous rod extending through said sleeves, having ends non-circular in cross section, elastic sleeve bushings in the outer ends of said housings one against each of said arms, additional elastic sleeve bushings around the inner ends of said sleeves located within the inner ends of said housings, plates one against the outer side of each of said arms connected thereto at one end having complementary non-circular openings through which the ends on said rod pass, fitting therein, a generally vertical member at the outer side of each chassis side frame member having pivotal connection at its lower end to one end of each of said arms, the opposite ends of said arms being located opposite the ends of said housings and sleeves, spring resisting means between said arms and the adjacent chassis side frame member, a link pivotally connected at one end to the upper end of each of said vertical members, and a support connected to each of said chassis frame members extending thereabove to which said links are pivotally connected at their other ends generally vertically above the axis of said rod.

2. A structure as defined in claim 1, said pivotal connection of the lower ends of said vertical members to said arms being about a horizontal axis and said pivotal connection of the link to said vertical member at the upper portion thereof comprising, a ball and socket universal connection, a boss extending outwardly from the lower end portion of each vertical member, a fork mounted on the boss to turn about a vertical axis, and a horizontal wheel spindle extending outwardly from said fork.

3. A structure as defined in claim 1 said vertical members at their upper and lower ends having a universal ball and socket pivotal connection respectively to said links and said arms, and a wheel carrying spindle mounted on each of said vertical members adjacent the lower end thereof, upon which a wheel is adapted to be rotatably mounted to turn about a horizontal axis.

4. In a structure as described, a motor vehicle chassis frame having two spaced side frame members, an arm permanently connected with each of said side frame members at the upper side thereof, extending upwardly therefrom, a generally vertical member located at the outer side of each chassis side frame member and its connected arm, links pivotally connected adjacent one end, one to the upper end portion of each arm, a universal pivotal connection between the other end of each of said links and the upper end portions of adjacent vertical members, a rod extending across and below said side frame members spaced a distance from the lower ends of said vertical members, a second arm at each end of said rod fixed in non-rotating relation thereto, said second arms extending to the lower end portions of the adjacent vertical members, resisting springs between said arms and the chassis frame side members, a generally horizontal wheel spindle at the outer side of said lower portion of each vertical member, means for securing said spindles at their inner ends, one to each of said vertical members near the lower ends thereof, and for securing the lower end portions of said vertical members, one to each of said second arms for universal movement of said spindles relative to said second arms, and two aligned horizontal housings at the lower portions of said chassis side frame members, an axially located sleeve within each housing, extending therethrough, said rod passing through said sleeves, means for securing the housings in fixed position relative to said chassis frame members and resilient members surrounding said sleeves secured therebetween and said housings, said resilient members at the outer ends of the housing bearing against the inner sides of said second arms.

5. Structure having the elements in combination defined in claim 4, and a transverse beam extending between and secured to said chassis frame members, and means connecting said housing to the beam, parallel thereto and at its lower side.

References Cited in the file of this patent

UNITED STATES PATENTS

| | | |
|---|---|---|
| 2,166,774 | Tjaarda | July 18, 1939 |
| 2,171,157 | Mathews | Aug. 29, 1939 |
| 2,270,571 | Woolson et al. | Jan. 20, 1942 |
| 2,290,923 | Wahlberg | July 28, 1942 |
| 2,405,458 | Slack et al. | Aug. 6, 1946 |
| 2,477,822 | Probst | Aug. 2, 1949 |
| 2,483,974 | Hicks et al. | Oct. 4, 1949 |
| 2,517,611 | Utz | Aug. 8, 1950 |
| 2,529,806 | Konopka et al. | Nov. 14, 1950 |
| 2,555,141 | Leighton | May 29, 1951 |

FOREIGN PATENTS

| | | |
|---|---|---|
| 615,165 | Germany | June 28, 1935 |